(12) United States Patent
Hoglund

(10) Patent No.: US 7,818,913 B1
(45) Date of Patent: Oct. 26, 2010

(54) ICE FISHING TIP-UP SYSTEM

(76) Inventor: Daniel D. Hoglund, 708 Riverside Dr. SE., St. Cloud, MN (US) 56304

( * ) Notice: Subject to any disclaimer, the term of this patent is extended or adjusted under 35 U.S.C. 154(b) by 435 days.

(21) Appl. No.: 11/127,471

(22) Filed: May 11, 2005

Related U.S. Application Data

(60) Provisional application No. 60/570,055, filed on May 11, 2004.

(51) Int. Cl.
*A01K 97/01* (2006.01)
*A01K 97/12* (2006.01)

(52) U.S. Cl. .................... 43/17; 43/4; 43/16

(58) Field of Classification Search .............. 43/1, 43/4, 4.5, 15, 16, 17
See application file for complete search history.

(56) References Cited

U.S. PATENT DOCUMENTS

| | | | |
|---|---|---|---|
| 76,489 A | 4/1868 | McCaughan | |
| 77,893 A | 5/1868 | Koehler | |
| 202,818 A | 4/1878 | Hesse | |
| 962,420 A | 6/1910 | Dibbles | |
| 2,008,555 A | 7/1935 | Kovane | |
| 2,714,270 A | 8/1955 | Premo | |
| 2,786,294 A * | 3/1957 | Whitacre | 43/17 |
| 3,041,770 A | 7/1962 | Witbro | |
| 3,466,781 A | 9/1969 | Nelson et al. | |
| 3,578,748 A | 5/1971 | Hurd | |
| 3,641,693 A * | 2/1972 | Pinnow | 43/17 |
| 4,079,537 A * | 3/1978 | Chretien | 43/17 |
| 4,270,297 A | 6/1981 | Yates | |
| 4,373,287 A | 2/1983 | Grahl | |
| 4,567,686 A * | 2/1986 | Akom | 43/17 |
| 4,685,240 A | 8/1987 | Fralick | |
| 4,747,226 A * | 5/1988 | Todd | 43/4 |
| 4,823,494 A | 4/1989 | Waterman | |
| 4,862,627 A * | 9/1989 | Keller | 43/17 |
| 4,980,986 A | 1/1991 | Harper | |
| 4,993,182 A | 2/1991 | Monsen | |
| 5,074,072 A | 12/1991 | Serocki et al. | |
| 5,157,855 A * | 10/1992 | Schmidt et al. | 43/17 |
| 5,448,849 A * | 9/1995 | Burgett | 43/17 |
| 5,450,687 A | 9/1995 | Fox | |
| 5,911,569 A | 6/1999 | Isakson | |
| 6,675,523 B1 * | 1/2004 | Huiras et al. | 43/4 |

\* cited by examiner

*Primary Examiner*—David J Parsley
(74) *Attorney, Agent, or Firm*—Albert W. Watkins

(57) ABSTRACT

An ice fishing tip-up system includes a rod, a fishing line, a bobber stop coupled to the fishing line, and a tip-up device. The tip-up device includes a base, an arm extending from the base, a lever supporting a line-engaging end having a set slot through which the line will pass, but not the bobber stop, and a flag attached through a resilient wire to the base. Distal to the line-engaging end is a trip end. The resilient wire applies a spring force to the trip end of the lever, the effect of which is variable depending upon the distance between the wire point of contact of to lever and the lever pivot point. A base serves to support the lever, insulate the ice hole to prevent the hole from freezing shut, and provides a selectively opened slot for separating the base from fishing line.

19 Claims, 3 Drawing Sheets

ICE FISHING TIP-UP SYSTEM

CROSS REFERENCE TO RELATED APPLICATIONS

This application claims priority to U.S. provisional patent application Ser. No. 60/570,055 filed May 11, 2004 of the same title and naming the same inventor, the contents which are incorporated herein by reference in entirety.

BACKGROUND OF THE INVENTION

1. Field of the Invention

This invention pertains generally to fishing, and more particularly to signaling devices indicative of a strike on a fishing line and to an ice fishing hole cover incorporating the signaling device.

2. Description of the Related Art

Ice fishing is widely practiced throughout the world, by persons of all ages and backgrounds. The ice fisherman will first make a hole in ice formed on a body of water, and then will pass a line terminated by a baited hook through the hole. In its simplest form, ice fishing equipment might include a simple pole having a length of line, a hook attached to the line, and a weighted sinker attached above the baited hook. However, to conveniently monitor the status of baited hooks employed during ice fishing, sometimes from a distance and at other times merely for the convenience of the fisherman to free up hands for other tasks or activities, a tip-up is frequently utilized. A tip-up will commonly employ a visual indicator to indicate a strike, and a guide for centering the fishing line in the ice hole. In the prior art, the tip-up may be combined directly with a fishing line into a unitary device, or may alternately be provided as a separate device used in combination with a separately provided ice fishing pole. The fishing line with baited hook is coupled to tip-up, and an indicator on the tip-up responds to disturbances at the baited end of the line.

Exemplary of the prior art tip-ups is U.S. Pat. No. 4,993,182 to Monsen, the teachings which are incorporated herein by reference. Monsen illustrates a cover, a standard extending vertically from the cover, and a signaling flag. The flag is triggered by motion of a reel upon which fishing line is wound. Unfortunately, in the Monsen design, a fisherman is limited to the reel disclosed therein, and has no choice of rod or reel. Furthermore, the base or cover fully encompasses the fishing line as the line passes into the hole. While this at first blush helps to prevent freezing within the hole, the cover also presents an undesirable obstacle during the landing of a fish. In another patent of interest, U.S. Pat. No. 5,911,569 to Isakson, the teachings which are also incorporated herein by reference, some of the limitations of Monsen are addressed. Nevertheless, Isaakson lacks desirable control over sensitivity, and requires a substantial cover and apparatus which are undesirable from both a cost and transporting perspective.

Additional patents of interest include U.S. Pat. Nos. 5,450,687 to Fox; 5,074,072 to Serocki et al.; 4,980,986 to Harper; 4,823,494 to Waterman; 4,685,240 to Fralick; 4,373,287 to Grahl; 4,270,297 to Yates; 3,578,748 to Hurd; 3,466,781 to Nelson et al.; 3,041,770 to Witbro; 2,714,270 to Premo; 2,008,555 to Kovane; 962,420 to Dibbles; 202,818 to Hesse; 77,893 to Koehler; and 76,489 to McCaughan, the teachings of each which are incorporated herein by reference. Unfortunately, the known tip-ups can be cumbersome, may lack sensitivity or be overly sensitive, are prone to freezing in the fishing hole, and are limited in application to use with simple or particular ice fishing poles.

SUMMARY OF THE INVENTION

Exemplary embodiments of the present invention solve inadequacies of the prior art by providing an ice fishing tip-up system including a rod, a reel coupled to the rod, and a tip-up device. The reel maintains a length of line and the tip-up device is coupled to the line. The tip-up device includes a base, an arm extending from the base, a bobber stop coupled to the line, and a flag attached to the base. The base is adapted for placement over a hole cut into ice formed on a body of water. The arm extends from the base and couples to a lever at a pivot point, the lever defining a notch end opposite a trip end. The bobber stop is coupled to the line and configured for removable attachment with the notch end of the lever. The flag defines a flag tip movable between a set position and an up position, the set position characterized by the flag tip being coupled to the trip end of the lever. Upon disturbance of the line, the flag tip in the set position releases from the trip end to indicate a strike, and the lever moves about the pivot end to permit line to be stripped off of the reel.

In a first manifestation, the invention is an ice fishing tip-up system. The system includes a rod; a length of line; and a stop engaged with the line. A base is adapted for placement over a hole cut into ice formed on a body of water. An arm extends from the base, and supports a lever pivotal about a pivot point between a first ready position and second strike indicative position. The lever has a trip end and a line-engaging end configured for removable attachment with the stop, the line-engaging end being distal to the trip end. A resilient member in a first position extends from the base generally linearly away therefrom and in a second position arcs between base and lever, contacting the lever at a first contact point when in first ready position and resiliently biased to apply a force to the lever encouraging the lever to remain in the first ready position. A magnitude of the biasing force is adjustable by varying a distance between pivot point and first contact point. An indicator is responsive to lever position to indicate the first ready position and the second strike indicative position.

In a second manifestation, the invention is an ice fishing tip-up device. The tip-up device has a base adapted for placement over a hole cut into ice formed on a body of water. A lever is pivotal about a pivot point between a first ready position and second strike indicative position and has a trip end and a line-engaging end configured for removable coupling to a fishing line, the line-engaging end distal to the trip end. A resilient member contacts the lever at a first contact point when the lever is in the first ready position. An adjustable force is applied to the lever encouraging the lever to remain in first ready position. An indicator is responsive to the lever position to indicate first ready position and second strike indicative position.

In a third manifestation, the invention is an ice fishing hole cover suitable for covering and insulating a hole in an ice layer over a body of water, while permitting an ice fishing line to pass through the cover. The cover has an exposed primarily closed surface with an opening extending entirely through the surface from a first point primarily bounded by the surface to an edge thereof, through which the ice fishing line may operatively pass. A closure is provided that, in a first position, permits the fishing line to pass through the opening from the first point to beyond the edge, and thereby beyond the cover. The closure is additionally operative to close the opening adjacent the edge of the surface, thereby restricting an ice fishing line to an opening through and fully circumscribed by the cover.

OBJECTS OF THE INVENTION

A first object of the invention is to provide an ice fishing tip-up indicative of whether or not there has been a strike on the line. A second object of the invention is to provide adjustment within the tip-up to accommodate all sizes and types of bait and fish. Another object of the present invention is to enable a fisherman to use preferred ice fishing equipment, including any of the myriad of fishing rods, reels, lines, sinkers, baits and the like, and to be able to fully reel in the line when required. A further object of the invention is to enable longer use of the tip-up in cold weather, by providing a thermally insulating cover. Yet another object of the present invention is to enable the cover, and preferably the tip-up, to be removed if desired during the landing of a fish.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
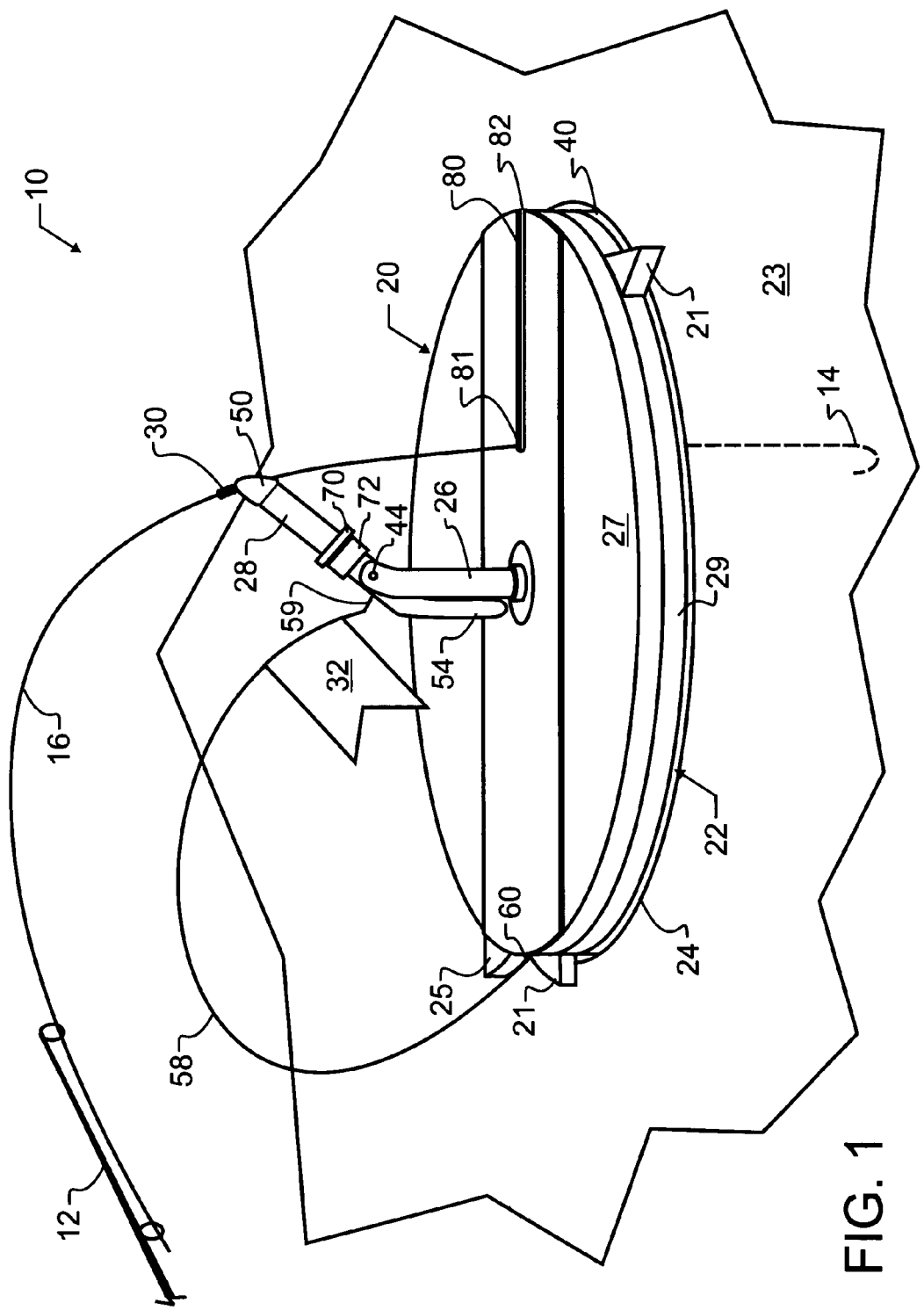
FIG. 1 illustrates a preferred embodiment ice fishing tip-up system designed in accord with the teachings of the present invention and further incorporating a preferred embodiment tip-up device according to the preferred embodiment, from a projected plan view in a "ready" position.
Figure 2:
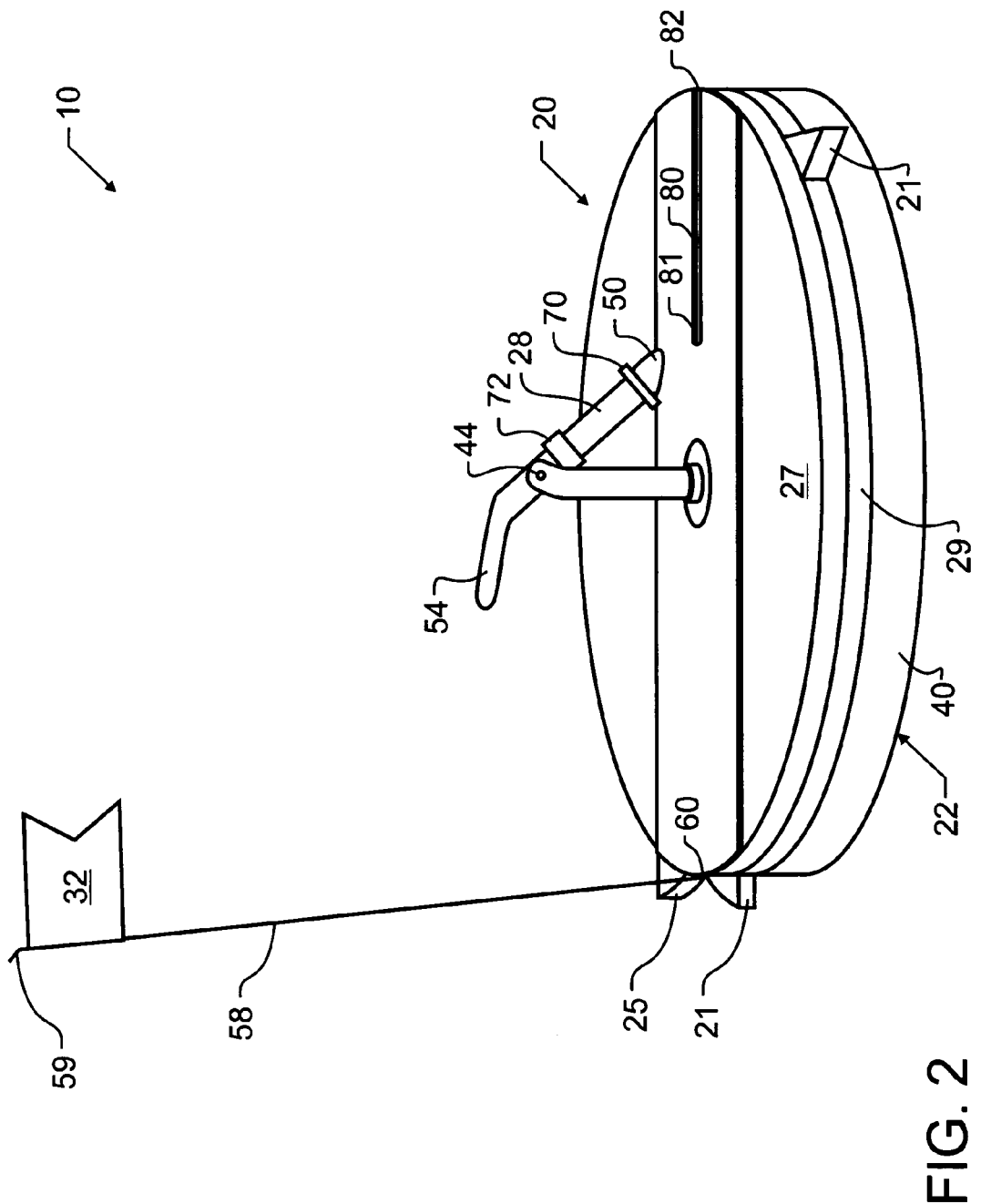
FIG. 2 illustrates the preferred embodiment ice fishing tip-up system of FIG. 1 indicating a strike.

A preferred embodiment ice fishing tip-up system 10 designed in accord with the teachings of the present invention is illustrated in FIG. 1. Tip-up system 10 includes a rod 12, a length of line 16, and a tip-up device 20 coupled to line 16. Tip-up device 20 includes a base 22 adapted for placement over a hole 24 cut into ice 23, the ice as is known to form on a body of water during colder weather. In addition, tip-up device 20 includes an arm 26 extending from the base 22 and coupled to a lever 28. A slip bobber stop 30 or other suitable device as is known in the fishing art is coupled to line 16, and passes through and removably engages with lever 28. For the purposes of the present disclosure, a slip bobber stop will be understood to be any device which forms a fixed point on line 16. In the most preferred embodiment, this is achieved using a specially wound string that loops about and frictionally engages with line 16. However, it will be understood and recognized that many other similar suitable devices, including but not limited to simple knots in the line, sinkers, small bobbers or other such devices will perform the required function. Nevertheless, a slip bobber stop formed from thread or the like is most preferred, since such can be wound upon a reel without any interference therewith, thereby improving the retrieval of fish. Furthermore, whatever stop is utilized, it will most preferably pass unobstructed through base 22. A flag 32 is attached to base 22 and is movable between a set position as illustrated in FIG. 1, indicative of a "ready" or "active fishing" state and characterized by flag 32 being coupled to lever 28, and an up position as illustrated in FIG. 2, indicative of a "strike" or fish pulling on line 16.

Arm 26 extends from base top surface 22 and couples to lever 28 at a pivot point 44, thereby spacing lever 28 above base top surface 22 and permitting lever 28 to pivot about pivot point 44 without interference from or with base 20. Lever 28 has a line-engaging end 50, and at the opposite end has a trip end 54. Slip bobber stop 30 couples to line 16 and, when tip-up system 10 is in the "ready" position illustrated in FIG. 1, is removably attached to line-engaging end 50.

In this "ready" position illustrated in FIG. 1, tip-up device 20 positions the baited end 14 of line 16 at a selected depth by utilizing slip bobber stop 30 to selectively position line 16 within set slot 52. Slip bobber stop 30 forms a connection to line 16 at a particular point on line 16, which for the purposes of the present invention will be construed to be a fixed point during operation of tip-up device 20, but may also be adjustable selectively by the fisherman. Although slip bobber stop 30 or suitable equivalent may slide upon line 16, such sliding will be understood to occur insignificantly during operation of tip-up system 10 described herein below. As a result, the available line 16 and therefore maximum depth of the line baited end 14 is controlled by the positioning of slip bobber stop 30. Slip bobber stop 30 secures line 16 to the line-engaging end 50 of the lever 28 by cradling the slip bobber stop 30 within the set slot 52 at the line-engaging end 50 of the lever 28. In this manner, the tip-up device 20 is in the "ready" position such that the weight of the line 16, any sinkers, bait, and any additional force delivered by the bait in its movement, is supported by line-engaging end 50 of tip-up device 20.

Flag 32 is retained adjacent flag end 59 of a resilient wire 58, and wire 58 is attached to base 20 at an opposite end 60. In the "ready" position illustrated in FIG. 1, wire 58 is coupled through flag end 59 to trip end 54 of lever 28. In a preferred embodiment, wire 58 is frictionally coupled to trip end 54. In this embodiment, wire 58 may preferably take on a rectangular cross-section, with a width of the cross-section approximating the width of trip end 54, facilitating placement of flag end 59 on trip end 54. However, frictional coupling is not solely contemplated herein. Trip end 54 may alternatively include a magnet disposed within lever 28. In such case, the magnet could also be selectively positioned to adjust magnetic force coupling wire 58 to trip end 54. In an even further alternative embodiment, other devices or couplings are contemplated herein which are known in the more generic hardware technologies which would perform equivalent function.

In the ready state illustrated in FIG. 1, the balance of lever 28 is such to hold bobber stop 30 in engagement with line-engaging end 50. When line 16 is disturbed by a pull on fishing line 16 baited end 14, thus initiating movement of lever 28 about pivot point 44, resilient wire 58 releases from this "ready" position illustrated in FIG. 1 and travels to the up position shown in FIG. 2 to indicate a possible strike of a fish on line 16. The amount of pulling force on baited end 14 required to initiate this change of state is dependent upon the balance within lever 28, the amount of force applied by resilient wire 58, and the distance between flag end 59 and pivot point 44. In other words, placement of flag end 59 at greater distances from pivot point 44 will increase the forces required to activate a change of position from "ready" to "strike". The amount of force will not only be dictated by the distance from pivot point 44 to flag end 59, but will also be dictated by the spring constant of resilient wire 58. A change in dimension, composition, or geometry of wire 58 may then be used to adjust the amount of force applied. As may be apparent from the foregoing, a variety of shapes, materials and geometries are contemplated herein, and any suitable member may be used which achieves the intended repositioning of indicator flag 32 and the much desired control of activation force.

The control over activation force permits a fisherman to use different types of bait, and to fish for different sizes or types of fish, using the same tip-up system 10 or at least the same tip-up device 20. For example, when ice fishing for very small pan fish, baited end 14 may comprise either a simple hook or fly, or a hooked worm or the like. In such instance, it may be desired to adjust lever 28 for extreme sensitivity, since a small fish will likely not apply much force, and since the bait itself will apply no force at all. However, when larger fish are being pursued, and perhaps more importantly, when live minnows or the like are used as the bait, the activation force will need to be greater than in the case of pan fishing described above. In this case, minnows may swim about, applying small forces to line 16. These forces would not be desired to cause activation. Consequently, applying the teachings of the present invention to the preferred embodiment, flag end 59 will be spaced farther from pivot 44 for minnow bait than for pan fishing with worms.

Where desired, additional means may be provided for adjusting the activation force. Solely for the purposes of illustration, and not limited thereto, if a magnet is provided within trip end 54, the magnet may be used to assist with the retention of flag end 59, presuming wire 58 is, in fact, a ferrous or similar material. However, additional trip force may be provided by providing ferrous or like material within arm 26 as well. The force required to initiate motion within lever 28 will then include the forces produced by wire 58 and additionally the forces necessary to overcome the magnetic attraction between trip end 54 and arm 26. In one conceived alternative embodiment, wire 58 is simply frictionally coupled to trip end 54. A steel rivet, washer, post or the like is provided near the termination of trip end 54, adjacent to arm 26. A magnet is provided in a special slider, such as a dovetail groove or the like, within arm 26, and so may be repositioned from immediately adjacent to the steel rivet, or moved farther therefrom. In this alternative embodiment, the magnetic coupling forces, which decrease with a square of the distance, may also be used to control the activation force. In view of the foregoing description of the preferred and alternative embodiments for controlling activation force, it should be apparent that other means or methods of selectively or controllably biasing lever 28 may also be applied, beyond the preferred resilient forces of wire 58 and the alternative magnetic forces, and such other means or methods will be apparent to those skilled in the art upon a review of the present specification.

An additional preferred technique for biasing and producing activation force, which further introduces desirable hysteresis in the pivot, is provided through the use of weight 70. In the "ready" position of FIG. 1, weight 70 rests against stop 72. However, as illustrated in FIG. 2, weight 70 slides down lever 28 toward line-engaging end 50 as lever 28 pivots, thereby shifting the balance of lever 28 towards line-engaging end 50. This motion assists with the full activation of lever 28, ensuring that lever 28 completely and fully pivots and thereby releases bobber stop 30. As can be understood from the foregoing description, by adjusting the aforementioned forces from wire 58 and other coupling, and the balance within lever 28, tip-up device 20 may be adjusted from being highly sensitive to small forces applied to the line 16 to being far more insensitive thereto.

Figure 3:
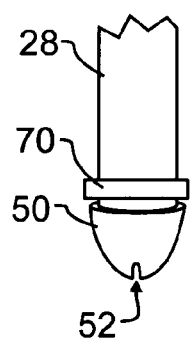
FIG. 3 illustrates a preferred notch end of a lever utilized in the preferred embodiment tip-up device of FIG. 1 from top plan view.

FIG. 3 illustrates the end of lever 28 adjacent and including line-engaging end 50. Set slot 52 is adapted to allow line 16 to pass therein, but is sized to be smaller than slip bobber stop 30. Consequently, when in the "ready" position illustrated in FIG. 1, slip bobber stop 30 will engage line-engaging end 50, while line 16 passes through set slot 52. In the view shown in FIG. 3, set slot 52 is unoccupied, indicating that flag 32 is in the "strike" position as illustrated in FIG. 2.

Figure 4:
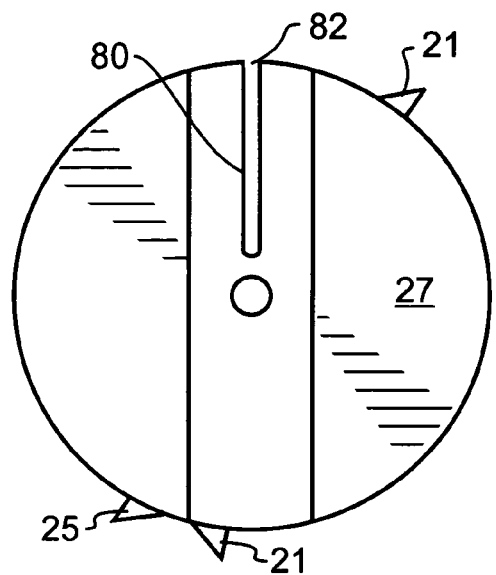
FIG. 4 illustrates a preferred base and hole cover utilized in the preferred embodiment tip-up device of FIG. 1 from top plan view in an open position.
Figure 5:
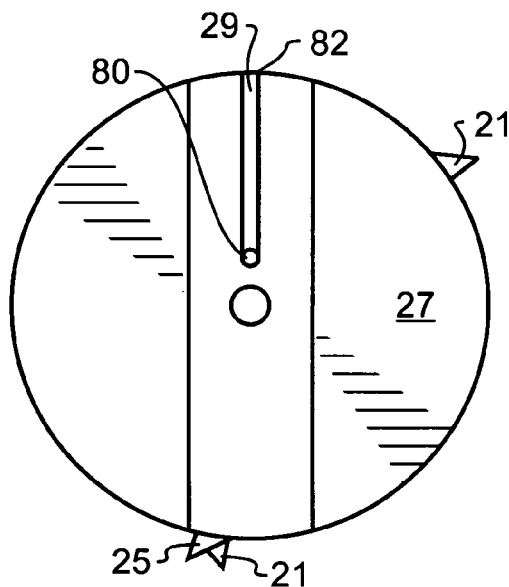
FIG. 5 illustrates the preferred base and hole cover of FIG. 4 from top plan view in a closed position.

FIGS. 4 and 5 illustrate base 22 in greater detail, from top view and with arm 26, lever 28 and other indicator and pivot related components removed for simplicity of illustration. Base 22 defines a skirt 40 adapted to fit over and insulate hole 24 cut into ice 23. In one embodiment, the skirt 40 is a rubber skirt configured to block wind and insulate the exposed water in the ice fishing hole 24. Skirt 40 may simply extend as a single simple layer down from base 22, or may alternatively take on any suitable configuration, including the myriad of boot and gasket geometries known from those arts.

Figure 6:
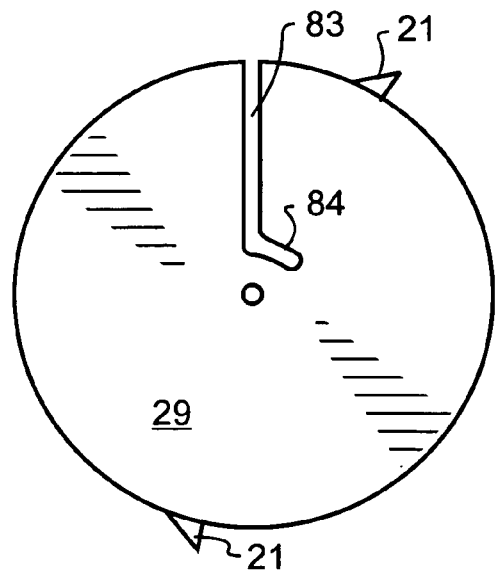
FIG. 6 illustrates a preferred second layer used in the preferred base and hole cover of FIG. 4 from top plan view.

In the most preferred embodiment illustrated herein, base 22 is fabricated from several circular, relatively planar layers. The top layer 27 of base 22 includes small ears or tabs 25 extending therefrom. A slot 80 is formed entirely through top layer 27, and extends from a more central location 81 which is generally surrounded by the material of top layer 27, out to an edge 82 of top layer 27. A second layer 29 adjacent to top layer 27 includes small ears or tabs 21 protruding therefrom. Rotation of layer 29 relative to layer 27, which may for exemplary purposes be manually initiated by applying appropriate forces to tabs 21 and 25, will cause layer 29 to primarily close slot 80. However, as illustrated in FIG. 6, layer 29 has both a radially extending slot 83 and an extension 84 that extends at a fixed radius from the center of layer 29. The effect of this is illustrated in FIG. 5, wherein the opening of slot 80 is inhibited from extending entirely out to edge 82, and is instead limited to a smaller circle fully surrounded by the layers 27, 29. This reduces air exposure, while still permitting a fisherman to rotate layer 29 to the open position of FIG. 4 and remove tip-up device 20 completely from the hole, even while a fish is pulling on baited end 14. In the preferred embodiment, the material(s) used for layers 27, 29 will be thermally insulating, to better impede the formation of ice on the open water in hole 24.

While the foregoing details what is felt to be the preferred embodiment of the invention, no material limitations to the scope of the claimed invention are intended. Further, features and design alternatives that would be obvious to one of ordinary skill in the art are considered to be incorporated herein. For exemplary purposes, and not limited solely thereto, it is known in the art to use various types of indicators. While in the preferred embodiment flag 32 serves as a visual indicator, an electrical circuit could alternatively be provided which would activate a local or remote light source, sound or other suitable indicator. In another conceived embodiment, a notch could be provided in wire 58 adjacent flag end 59, which presents an alternative tip-up mechanism. In this alternative, bobber stop 30 could be positioned to either engage in set slot 52 and operate as described herein above, or alternatively engage directly in this notch in flag end 59, causing flag 32 to bob similar to the way a standard bobber bobs when a fish strikes. Consequently, the scope of the invention is set forth and particularly described in the claims herein below.

I claim:

1. An ice fishing tip-up device, comprising:
   a base adapted for placement over a hole cut into ice formed on a body of water;
   a pivotal axis defined generally parallel to a surface of said body of water;
   a lever pivotal about said pivotal axis between a first ready position and second strike indicative position and having a trip end and a line-engaging end configured for removable coupling to a fishing line, said line-engaging end distal to and separated from said trip end by said pivotal axis, said line-engaging end comprising an open slot through which said fishing line passes unencumbered and through which passage of a bobber stop is blocked, said open slot having an open slot end adjacent an end of said lever and having a closed slot end more nearly adjacent to said pivot point than said first open slot end, said closed slot end farther from said body of water than said open slot end when said lever is pivoted into said first ready position and said closed slot end closer to said body of water than said open slot end when said lever is pivoted in said second strike indicative position;
   a resilient member contacting said lever at a first contact point on said trip end when said lever is in said first ready position, said resilient member resiliently biased to apply an adjustable force to said lever encouraging said lever to pivot in a rotary direction about said pivotal axis towards said first ready position and move said line engaging end farther from said body of water, said resilient member uncoupled from said first contact point when said lever is in said second strike indicative position; and
   an indicator responsive to said lever position to indicate said first ready position and said second strike indicative position.

2. The ice fishing tip-up device of claim 1, wherein a magnitude of said adjustable force is variable by varying a distance between said pivotal axis and said first contact point.

3. The ice fishing tip-up device of claim 1, further comprising an arm extending from said base, said lever coupled to said arm, elevated from said base by said arm, and pivotal thereon.

4. The ice fishing tip-up device of claim 1, wherein said resilient member extends in a first position from said base generally linearly away therefrom and in a second position arcs between said base and said lever.

5. The ice fishing tip-up device of claim 1, wherein said adjustable force further comprises a means for varying balance within said pivotal lever.

6. The ice fishing tip-up device of claim 5, wherein said means for varying balance further comprises a weight coupled to said lever at a first coupling location a first radius from said pivot point on said lever and moving to a second coupling location at a radius from said pivot point different from said first radius responsive to said lever pivoting.

7. The ice fishing tip-up device of claim 3, wherein said adjustable force further comprises a magnetic force induced by a magnetic coupling between said pivotal lever and said arm.

8. The ice fishing tip-up device of claim 1, wherein upon the occurrence of a fish strike a bobber stop couples with said line-engaging end to rotate said lever about said pivot point and thereby bring said line-engaging end closer to said body of water.

9. In combination, an ice fishing hole formed through an ice layer to expose a body of water, an ice fishing line passing through said ice fishing hole into said body of water, and an ice fishing tip-up system for indicating when a fish strikes said ice fishing line;
   said ice fishing line having a first end out of water and having a baited end distal to said first end for luring and capturing fish within said water, and having a stop coupled with said line at a predetermined position between said first end and said baited end;
   said ice fishing tip-up system comprising:
      a base resting upon said ice;
      an arm extending from said base away from said water;
      a pivotal axis extending generally parallel to said base and spaced from said base by said arm;
      a lever pivotal about said pivotal axis, said pivotal axis dividing said lever into a first side having a flag engaging surface and a second side having a line engaging member;
      a resilient flag arm extending from said base, in a first stable state extending to said lever and applying a force on said flag engaging surface of said lever urging said lever to rotate in a first direction about said pivotal axis to thereby indicate a position set to detect said fish strike, and in a second stable state removed from said flag engaging surface and thereby indicating a fish strike;
      said ice fishing line passing through said line engaging member and said stop engaging with said line engaging member, a fish strike pulling said stop towards said water with sufficient force to overcome said resilient flag arm force on said lever and cause said lever to rotate in a second direction opposed to said first direction about said pivotal axis, and thereby switch said resilient flag arm from said first state to said second state.

10. The combination ice fishing hole, ice fishing line, and ice fishing tip-up system of claim 9, wherein a distance from said pivotal axis to the engagement of said flag on said flag engaging surface is adjustable.

11. The combination ice fishing hole, ice fishing line, and ice fishing tip-up system of claim 9, wherein said stop further comprises a bobber stop.

12. An ice fishing tip-up system comprising:
   a length of line terminating at a first end and a second end distal to said first end;
   a stop engaged with said line between said line first end and said line second end and thereby dividing said length of line into a first line segment extending between said line first end and said stop and a second line segment extending between said stop and said line second end;
   a base adapted for placement over a hole cut into ice formed on a body of water,
   a lever pivotal about a pivot point located between a trip end of said lever and a line-engaging end of said lever distal to said lever trip end through an arc terminating at a first line-releasing termination and at a second line-holding termination, said line engaging end having an open slot through which said first line segment passes unencumbered and through which passage of said stop is blocked, said open slot having an open slot end adjacent an end of said lever and having a closed slot end more nearly adjacent to said pivot point than said first open slot end, said closed slot end farther from said body of water than said open slot end when said lever is pivoted in said arc to said first line-releasing termination and said closed slot end closer to said body of water than said open slot end when said lever is pivoted in said arc to said second line-holding termination, said stop operative to pivot said lever about said pivot point and thereby bring said line engaging end closer to said body of water when said first line segment passes through said slot into said body of water and said lever is pivoted to said second line-holding termination and said stop moves towards said body of water;

a resilient member contacting said lever at a first contact point on said trip end when said lever is pivoted to said second line-holding termination, said resilient member resiliently biased to apply a force to said lever encouraging said lever to pivot in a rotary direction about said pivot point towards said second line-holding termination and move said line engaging end farther from said body of water, a magnitude of said force adjustably preset by varying a distance between said pivot point and said first contact point, said resilient member uncoupled from said first contact point when said lever is pivoted to said first line-releasing termination; and an indicator responsive to said lever position to indicate said lever is adjacent said first line-releasing termination.

13. The ice fishing tip-up system of claim 12, further comprising a rod, and wherein said stop further comprises a slip bobber stop.

14. The ice fishing tip-up system of claim 12, further comprising an arm extending from said base, said lever coupled to said arm, elevated above said body of water from said base by said arm, and pivotal thereon.

15. The ice fishing tip-up system of claim 12, wherein said resilient member extends in a first position from said base generally linearly away therefrom and in a second position arcs between said base and said lever.

16. The ice fishing tip-up system of claim 15, wherein said indicator comprises a flag located on said resilient member distal to said base, coupled to said resilient member, and movable with said resilient member between indicating a first ready position and a second strike indicative position.

17. The ice fishing tip-up system of claim 12, further comprising a weight coupled to said lever at a first coupling location a first radius from said pivot point on said lever and moving to a second coupling location at a radius from said pivot point different from said first radius responsive to said lever pivoting.

18. An ice fishing hole cover suitable for covering and insulating a hole in an ice layer over a body of water, while permitting an ice fishing line to pass through said cover, comprising:

a first primarily closed generally planar surface having an opening comprising a notch formed radially therein extending entirely from above said surface vertically through said surface to said body of water, said opening additionally extending within said cover from a first point primarily bounded by said surface to an edge of said first primarily closed generally planar surface through which said ice fishing line may operatively pass;

a closure having a second generally planar primarily closed surface adjacent to, in contact with, and vertically displaced from said exposed primarily closed surface and aligned in a first position permitting said fishing line to pass through said opening from said first point to beyond said edge and thereby beyond said cover, and aligned in a second position immediately adjacent to and vertically displaced from said opening operative to vertically close said opening adjacent said edge of said surface, thereby restricting said ice fishing line to an opening through and fully circumscribed by said cover, said closure pivotal with respect to said first generally planar layer;

wherein said first primarily closed generally planar surface comprises a disc and said closure further comprises a disc of like diameter rotatable relative to said first primarily closed generally planar surface disc, said closure disc having a vertical opening extending within said closure disc vertically through said closure disc from a first point primarily bounded by said first primarily closed generally planar surface disc and extensive to an edge of said first primarily closed generally planar surface disc through which said ice fishing line may operatively pass; said closure disc opening rotatable into vertical alignment with said opening within said first primarily closed generally planar surface disc and thereby extending an open space vertically from above said cover to said body of water and radially through said cover entirely to an edge of said second generally planar primarily closed surface and further rotatable out of vertical alignment such that said open space is radially limited to less than said edge of said second generally planar primarily closed surface via rotation of said closure disc with respect to said disc of said primarily closed generally planar surface disc.

19. The ice fishing hole cover of claim 18, wherein said opening in said first primarily closed generally planar surface disc comprises a generally linear radially extensive notch, and said closure disc vertical opening comprises a first linear segment extending from an edge of said second generally planar primarily closed surface radially inward therefrom and a second segment angularly offset therefrom, such that said rotation out of vertical alignment comprises said first linear segment vertically misaligned with said linear radially extensive notch, and at least a portion of said second segment vertically aligned with at least a portion of said generally linear radially extensive notch.

* * * * *